United States Patent
Forloni

(10) Patent No.: US 10,850,910 B2
(45) Date of Patent: Dec. 1, 2020

(54) MULTILAYER POLYESTER FILM FOR READY MEALS

(75) Inventor: Roberto Forloni, Milan (IT)

(73) Assignee: Cryovac, LLC, Charlotte, NC (US)

( * ) Notice: Subject to any disclaimer, the term of this patent is extended or adjusted under 35 U.S.C. 154(b) by 1264 days.

(21) Appl. No.: 14/119,677

(22) PCT Filed: May 24, 2012

(86) PCT No.: PCT/EP2012/059723
§ 371 (c)(1),
(2), (4) Date: Apr. 10, 2014

(87) PCT Pub. No.: WO2012/160142
PCT Pub. Date: Nov. 29, 2012

(65) Prior Publication Data
US 2014/0234493 A1  Aug. 21, 2014

(30) Foreign Application Priority Data
May 24, 2011  (EP) .................................. 11167378

(51) Int. Cl.
| | | |
|---|---|---|
| *B65D 81/34* | (2006.01) | |
| *B32B 27/08* | (2006.01) | |
| *B32B 27/36* | (2006.01) | |
| *B32B 27/30* | (2006.01) | |
| *C09J 7/35* | (2018.01) | |
| *C09J 7/22* | (2018.01) | |
| *B32B 27/00* | (2006.01) | |

(52) U.S. Cl.
CPC ............ *B65D 81/343* (2013.01); *B32B 27/08* (2013.01); *B32B 27/30* (2013.01); *B32B 27/36* (2013.01); *C09J 7/22* (2018.01); *C09J 7/35* (2018.01); *B32B 27/00* (2013.01); *B32B 2274/00* (2013.01); *B32B 2307/31* (2013.01); *B32B 2307/518* (2013.01); *B32B 2307/702* (2013.01); *B32B 2439/70* (2013.01); *Y10T 428/1328* (2015.01); *Y10T 428/1352* (2015.01); *Y10T 428/2826* (2015.01)

(58) Field of Classification Search
CPC ....... B65D 81/343; B32B 27/30; B32B 27/36; B32B 27/08; B32B 2274/00; B32B 2307/31; B32B 2307/518; B32B 2307/702; B32B 2439/70; B32B 27/00; C09J 7/0242; C09J 7/35; C09J 7/22; Y10T 428/2826; Y10T 428/1352; Y10T 428/1328
See application file for complete search history.

(56) References Cited

U.S. PATENT DOCUMENTS

| | | | |
|---|---|---|---|
| 4,390,587 A | 6/1983 | Yoshimura et al. | |
| 4,732,795 A | 3/1988 | Ohya et al. | |
| 4,883,693 A | 11/1989 | Ohya et al. | |
| 5,270,390 A | 12/1993 | Shibuya et al. | |
| 5,824,398 A | 10/1998 | Shin | |
| 5,859,116 A | 1/1999 | Shih | |
| 6,110,600 A | 8/2000 | Ramesh | |
| 6,287,123 B1 | 9/2001 | O'Brien | |
| 6,287,613 B1 | 9/2001 | Childress et al. | |
| 6,342,282 B1 | 1/2002 | Yoshii et al. | |
| 6,565,985 B2 | 5/2003 | Ueyama et al. | |
| 6,610,392 B1 | 8/2003 | Ramesh et al. | |
| 6,623,821 B1 | 9/2003 | Kendig | |
| 6,682,825 B1 | 1/2004 | Kennedy et al. | |
| 6,964,816 B2 | 11/2005 | Scholl et al. | |
| 7,018,719 B2 | 3/2006 | Ueyama et al. | |
| 7,201,966 B2 | 4/2007 | Lischefski | |
| 7,207,157 B2 | 4/2007 | Wolf et al. | |
| 7,211,306 B2 | 5/2007 | Peiffer et al. | |
| 7,569,276 B2 | 8/2009 | Kendig et al. | |
| 7,687,123 B2 | 3/2010 | Broadus et al. | |
| 7,744,806 B2 | 6/2010 | Broadus et al. | |
| 7,993,713 B2 | 8/2011 | Ishii et al. | |
| 8,129,007 B2 | 3/2012 | Forloni | |
| 8,178,210 B2 | 5/2012 | Forloni et al. | |
| 2003/0198764 A1 | 10/2003 | Kendig | |
| 2004/0033382 A1 | 2/2004 | Kendig | |

(Continued)

FOREIGN PATENT DOCUMENTS

| | | | |
|---|---|---|---|
| AU | 2007304547 B2 | 4/2008 | |
| DE | 202006020560 U1 | 2/2009 | |

(Continued)

OTHER PUBLICATIONS

Tyle, Pradep, Flexible Packaging with OPP and O-PET films—Present and future, Popular Plastics & Packaging, Oct. 2005, pp. 63-68, General discussion of packaging in general; no detailed discussion of PET in packaging.

(Continued)

*Primary Examiner* — James C Yager

(74) *Attorney, Agent, or Firm* — Jason R. Womer

(57) ABSTRACT

Coextruded, biaxially oriented multilayer films comprising a base layer comprising a polyester having an intrinsic viscosity greater than 0.75 dl/g and a heat-sealable layer directly adhered to said base layer, said heat-sealable layer comprising an amorphous polyester having a melting temperature not higher than the melting temperature of the polyester of the base layer and a thermoplastic resin characterized in that the heat-sealable layer comprises a further polyester resin are described. Also packages comprising a container, a food product and the above coextruded, biaxially oriented multilayer film are described. The packages are particularly suitable for "ready-meals" to be used in conventional oven at high temperatures.

19 Claims, No Drawings

(56) References Cited

U.S. PATENT DOCUMENTS

| | | |
|---|---|---|
| 2007/0100076 A1 | 5/2007 | Hayes et al. |
| 2007/0202337 A1 | 8/2007 | Lischefski et al. |
| 2009/0123613 A1 | 5/2009 | Hayes et al. |
| 2010/0068355 A1 | 3/2010 | Berry et al. |
| 2010/0209637 A1 | 8/2010 | Munekata et al. |
| 2010/0247845 A1 | 9/2010 | Haruta et al. |
| 2012/0130699 A1 | 5/2012 | Martynov et al. |
| 2014/0017490 A1 | 1/2014 | Forloni |

FOREIGN PATENT DOCUMENTS

| | | |
|---|---|---|
| EP | 1391294 A1 | 2/2004 |
| EP | 1475228 A3 | 3/2005 |
| EP | 1471096 B1 | 3/2009 |
| EP | 2030782 A1 | 3/2009 |
| EP | 1471097 B1 | 6/2009 |
| EP | 2147783 A1 | 1/2010 |
| EP | 1034076 B2 | 12/2010 |
| EP | 1651438 B1 | 3/2011 |
| EP | 1976695 B1 | 3/2011 |
| EP | 1632346 B1 | 5/2011 |
| EP | 1984176 B1 | 11/2011 |
| EP | 1985443 B1 | 11/2011 |
| EP | 1993809 B1 | 9/2012 |
| EP | 2-87139 B1 | 3/2013 |
| EP | 2076138 B1 | 3/2013 |
| EP | 2691233 A1 | 2/2014 |
| GB | 2457308 A | 8/2009 |
| JP | 57159618 A | 1/1982 |
| JP | 2001071442 A | 3/2001 |
| JP | 3356200 | 12/2002 |
| JP | 2005161670 A | 6/2005 |
| JP | 2005161671 A | 6/2005 |
| JP | 200663134 A | 3/2006 |
| JP | 2007079280 A2 | 3/2007 |
| JP | 2010058366 A | 3/2010 |
| JP | 2010058365 A | 3/2020 |
| KR | 2007043133 A | 4/2007 |
| WO | 2007085380 A1 | 8/2007 |
| WO | 2007093495 A1 | 8/2007 |
| WO | 2008040404 A1 | 4/2008 |
| WO | 2012112368 A1 | 8/2012 |
| WO | 2012160142 A1 | 11/2012 |
| WO | 2013080143 A1 | 6/2013 |
| WO | 2014006205 A1 | 1/2014 |

OTHER PUBLICATIONS

Rapra Abstract Issue No. 201028, ICIS Chemical Business; Tritan Copolyester for Shrink Film Packaging, Nov. 2010, p. 18.
U.S. Appl. No. 13/030,713, filed Feb. 18, 2011, "Method of Orienting a Polyester Film", pp. 1-31, 5 Sheets of Drawings.
U.S. Appl. No. 14/007,678, filed Sep. 26, 2013, "Multilayer Heat-Shrinkable Asymmetrical Film", pp. 1-28.

MULTILAYER POLYESTER FILM FOR READY MEALS

TECHNICAL FIELD

The present invention relates to a coextruded, biaxially oriented, polyester film having a base layer and a heat-sealable layer useful for ready-meals packaging. The invention further relates to the use of the multilayer polyester film as a lidding film in food packaging operations.

BACKGROUND ART

Biaxially oriented polyester films are commonly used as lidding films, in particular for ovenable containers. Packaging systems comprising a rigid heat stable container having a thin flexible thermoplastic film sealed on it are commonly used for the packaging of the so-called "ready-meals", that is food products which only require heating to be ready for consumption. Ready-meals are suitable for heating in a conventional oven and/or in a microwave. Dual-ovenable ready-meal packages are suitable for both microwave and conventional ovens.

The film heat-sealed to the edge of the tray containing the ready-meal product seals the packaging and protects the ready-meal food from the external environment. The film can be removed from the tray shortly before heating or shortly after heating.

Sometimes, ready-meals packaging products undergo a heat treatment, such as sterilization or pasteurization, to increase their shelf-life.

Therefore, the films for ready meals should confer to the packaging good hermeticity and clean peelability also under high temperatures, and good resistance to heat treatments.

Various polyester films for ready-meals are known to confer hermeticity, peelability, and/or heat resistance.

EP1471096, EP1471097 and EP1475228 describe coextruded, heat-sealable and peelable polyester films having a base layer and a heat-sealable top layer consisting of binary blends of a polyester and a polyester incompatible polymer.

EP 2 030 782 describes coextruded, heat-sealable and peelable polyester films having a base layer and a heat-sealable top layer consisting of ethylene-acrylate copolymer optionally in admixture with polyester. These films have good sealability but they are not suitable for dual-ovenable ready meal packaging products.

WO 2007/093495 describes coextruded, biaxially oriented heat-shrinkable films comprising a base layer comprising a polyester having an intrinsic viscosity greater than 0.75 dl/g and a first outer heat-sealable layer directly adhered to said base layer, said heat-sealable layer comprising an amorphous polyester or a crystalline polyester having a melting temperature not higher than the melting temperature of the polyester of the base layer. These films have good sealability and peelability and are particularly useful for ready meal packaging for their resistance to heat treatment, such as pasteurization or regeneration in microwave or conventional oven. However, when regeneration in conventional oven at high temperatures, generally higher than 140° C., is required, these films often show some drawbacks and the appearance of the packaging after such a drastic heat treatment is not acceptable.

We have now found that the problem of the resistance to high temperature treatments can be solved by including a further polyester in the composition of the heat-sealable layer.

SUMMARY OF INVENTION

Therefore, a first object of the present invention is a coextruded, biaxially oriented multilayer film comprising a base layer comprising a polyester having an intrinsic viscosity greater than 0.75 dl/g and a heat-sealable layer directly adhered to said base layer, said heat-sealable layer comprising an amorphous polyester having a melting temperature not higher than the melting temperature of the polyester of the base layer and a thermoplastic resin characterized in that the heat-sealable layer comprises a further polyester resin.

The films object of the present invention are claimed in WO 2007/093495 but no specific examples or combinations of components including a film comprising the mixture amorphous polyester/thermoplastic resin/further polyester resin according to the present invention is described or mentioned in the prior art document.

The films object of the present invention are particularly resistant to heat treatments at temperatures higher than 140° C. and also show a better appearance (transparency and glossiness) compared with the already known films. These improved characteristics make them particularly suitable for the packaging of ready meals.

A further object of the present invention is a package comprising a container, preferably a tray, a food product, preferably a ready-meal product, and a lid formed of a coextruded, biaxially oriented, heat-sealable film comprising the mixture amorphous polyester/thermoplastic resin/further polyester resin sealed onto said container.

As used herein, the term "polyester" refers to both homo- and co-polyesters, wherein homo-polyester are defined as polymers obtained from the condensation of one dicarboxylic acid with one diol and co-polyesters are defined as polymers obtained from the condensation of one or more dicarboxylic acids with one or more diols.

The base layer of the film comprises a polyester having an intrinsic viscosity greater than 0.75 dl/g. Preferably, the base layer of the film comprises a polyester having an intrinsic viscosity of at least 0.80 dl/g.

As used herein, the intrinsic viscosity is defined as the limiting value of the reduced viscosity at infinite dilution of the polymer and is determined using a capillary viscometer. A suitable method for the determination of the intrinsic viscosity is for instance ASTM method D4603-03.

Examples of suitable polyesters are polyesters of ethylene glycol and terephthalic acid such poly(ethylene terephthalate) (PET). Preference is given to polyesters which contain ethylene units and include, based on the dicarboxylate units, at least 90 mol %, more preferably at least 95 mol %, of terephthalate units. The remaining monomer units are selected from other dicarboxylic acids or diols. Suitable other dicarboxylic acids are aromatic, cycloaliphatic and aliphatic dicarboxylic acids. Preferred examples of aromatic dicarboxylic acids are isophthalic acid, phthalic acid, 2,5-, 2,6- or 2,7-naphthalenedicarboxylic acid. Preferred examples of cycloaliphatic dicarboxylic acids are cyclohexanedicarboxylic acids, in particular cyclohexane-1,4-dicarboxylic acid. Preferred examples of aliphatic dicarboxylic acids are C3-C19 alkanedioic acids, in particular succinic acid, sebacic acid, adipic acid, azelaic acid, suberic acid and pimelic acid.

Suitable other diols are aliphatic and cycloaliphatic diols. Specific examples of aliphatic diols are ethylene glycol, diethylene glycol, triethylene glycol, propylene glycol, 1,3-butane diol, 1,4-butane diol, 1,5-pentane diol, 2,2-dimethyl-1,3-propane diol, neopentyl glycol and 1,6-hexane diol.

Specific examples of cycloaliphatic diols are 1,4-cyclohexanedimethanol and 1,4-cyclohexane diol, and optionally heteroatom-containing diols having one or more rings.

Mixtures or blends of homo- and/or co-polyesters can be used for the base layer provided that the polyester having an intrinsic viscosity greater than 0.75 dl/g represents the major proportion of the base layer. Preferably the base layer comprises at least 50%, 60%, 70%, 80%, 85%, 90% or 95% by weight of a polyester having an intrinsic viscosity greater than 0.75 dl/g, based on the total weight of the base layer. Preferably the polyester in the base layer is a PET having an intrinsic viscosity of at least 0.80 dl/g.

Any homo- and/or co-polyester can be blended with the polyester resin having an intrinsic viscosity greater than 0.75 dl/g. For example, the base layer can comprise at least 50%, 60%, 70%, 80%, 85%, 90% or 95% by weight of a polyester having an intrinsic viscosity greater than 0.75 dl/g and not more than 50%, 40%, 30%, 20%, 15% or 5% of an amorphous polyester resin.

Suitable amorphous polyester resins for use in the base layer are co-polyesters of terephthalic acid with an aliphatic diol and a cycloaliphatic diol, preferably ethylene glycol and 1,4-cyclohexanedimethanol. A specific example is PETG Eastar® 6763 sold by Eastman.

Particularly preferred base layer in the films object of the present invention comprise 60% of a polyester resin having an intrinsic viscosity greater than 0.75 dl/g and 40% of an amorphous polyester resin.

The characterizing feature of the multilayer film according to the present invention is the composition of the heat-sealable layer.

The heat-sealable layer comprises at least a first amorphous polyester resin, at least a thermoplastic resin and at least a further polyester resin. Said further polyester resin is different from the first amorphous polyester.

Suitable amorphous polyester resins are those deriving from an aliphatic diol and a cycloaliphatic diol with one or more dicarboxylic acids, preferably an aromatic dicarboxylic acid. Preferred amorphous polyesters are co-polyesters of terephthalic acid with an aliphatic diol and a cycloaliphatic diol, particularly ethylene glycol and 1,4-dicyclohexanedimethanol. The preferred molar ratios of the cycloaliphatic diol to the aliphatic diol are in the range from 10:90 to 60:40, preferably in the range from 20:80 to 40:60, more preferably from 30:70 to 35:65. A specific example of particularly preferred amorphous polyester is PETG Eastar® 6763, sold by Eastman, which comprises a co-polyester of terephthalic acid, about 33 mole % 1,4-cyclohexanedimethanol and about 67 mole % ethylene glycol.

In a particularly preferred embodiment, the amorphous polyester resin in the heat-sealable layer is the same polyester resin used in the base layer.

Suitable further polyesters are those deriving from one or more aliphatic diols, preferably ethylene glycol and/or cyclohexandimethanols, and an aromatic dicarboxylic acid, preferably terephthalic acid. Suitable further polyesters are preferably characterized by an intrinsic viscosity of at least 0.75 dl/g or higher and/or by a glass transition temperature Tg not higher than 80° C. and/or a melting point higher than 240° C. A suitable method for the determination of the intrinsic viscosity is for instance ASTM method D4603-03. A suitable method for the determination of the glass transition temperature is for instance ASTM method D-3418. A suitable method for the determination of the melting point is for instance ASTM method D3418.

Polyethylene terephthalate (PET) is preferred. A specific example of PET is Eastapak Copolyester 9921, sold by Eastman.

Suitable thermoplastic resins are polyamides, polystyrenes, in particular styrene-butadiene block copolymers, ionomers, ethylene/unsaturated carboxylic acid copolymers, such as ethylene/(meth)acrylic acid copolymers, ethylene/unsaturated esters copolymers, such as ethylene/vinyl acetate copolymers, ethylene/propylene copolymers and ethylene/cyclic olefin copolymers, such as ethylene/norbornene copolymers. Ethylene/(meth)acrylic acid copolymers are preferred. A specific example of particularly preferred thermoplastic resin is Primacor 3440, sold by Dow, which is an ethylene/acrylic acid copolymer with a co-monomer content acrylic acid 9.7%.

The amount of the first amorphous polyester in the heat-sealable layer of the multilayer film according to the present invention is generally from 25% to 70% by weight with respect to the total weight of the heat-sealable layer, preferably from 40 to 60% by weight. Specific preferred amounts are about 40%, and about 60% by weight.

The amount of the further polyester in the heat-sealable layer of the multilayer film according to the present invention is generally from 20% to 60% by weight with respect to the total weight of the heat-sealable layer, preferably from 25 to 50%. Specific preferred amounts are about 25%, about 45%, and about 60% by weight.

The amount of thermoplastic resin in the heat-sealable layer of the multilayer film according to the present invention is generally from 10% to 20% by weight with respect to the total weight of the heat-sealable layer, preferably about 15% by weight.

In a preferred embodiment the heat-sealable layer of the multilayer film of the present invention comprises from about 25 to 70% by weight of the amorphous polyester, from 10 to 20% by weight of the thermoplastic resin and from 20% to 60% by weight of the further polyester.

In a particularly preferred embodiment the heat sealable layer of the multilayer film of the present invention comprises from about 40 to 60% by weight of the first amorphous polyester, from 25 to 50% by weight of the further polyester and from 10 to 20% by weight of the thermoplastic resin Preferably said amorphous polyester is selected among those deriving from an aliphatic diol and a cycloaliphatic diol with one dicarboxylic aromatic acid, more preferably with terephthalic acid.

Specific examples of the blends of at least an amorphous polyester, at least a thermoplastic resin and at least a further polyester in the heat-sealable layer of the multilayer film according to the present invention are:

first amorphous polyester—60% w/w thermoplastic resin—15% w/w further polyester—25% w/w first amorphous polyester—40% w/w thermoplastic resin—15% w/w further polyester—45% w/w first amorphous polyester—25% w/w thermoplastic resin—15% w/w further polyester—60% w/w The total thickness of the multilayer film according to the present invention can range within wide limits, generally from 3 to 100 μm, in particular from 5 to 80 μm, preferably from 10 to 70 μm, still more preferably from 15 to 50 μm. The thickness of the base layer represents at least 50%, preferably from 50 to 80% of the overall thickness of the final multilayer polyester film according to the present invention.

The thickness of the heat-sealable layer is generally between about 5% and about 40% of the base layer. The heat-sealable layer can have a thickness up to about 25 μm, preferably up to about 15 μm, more preferably between about 0.5 μm and 10 μm, and more preferably between about 0.5 μm and 7 μm.

In a preferred embodiment, the film of the present invention has a three-layer structure: a base layer, a heat-sealable layer and an outer layer on the opposite side of the base layer to the heat-sealable layer.

The outer layer can comprise any suitable thermoplastic resin, although a polyester resin in preferred. The polyester resin can be the same as the polyester resin of the base layer or a different one.

From a practical point of view the use of the same polyester resin in the base layer and in the outer layer is preferred.

One or more of the layers of the film according to the present invention can optionally contain one or more additives conventionally used in the manufacture of polymeric films. Examples of such additives are anti-fogs, pigments, lubricants, anti-oxidants, radical scavengers, UV absorbers, thermal stabilizers, anti-blocking agents, surface active agents, slip aids, optical brighteners, gloss improvers, viscosity modifiers, etc.

In a preferred embodiment of the present invention slip and/or anti-blocking agents can be added to the outer layer. The additives can be added in the form of a concentrate in a polyester resin. The amount of the additives is generally from 0.2 to 5% by weight, preferably about 2%, of the total weight of the layer.

The film of the present invention preferably comprises at least one surface provided with anti-fogging properties. Typically, the anti-fogging surface is the surface of the heat-sealable layer, that is the surface directly facing the product in the container.

To obtain an anti-fogging surface anti-fogging agents may be compounded directly into the resins of the heat-sealable layer before extrusion of the film of the invention. Suitable anti-fogging agents are for instance non-ionic fluorinated surfactants, like alkylester fluorides, perfluoroalkyl ethyleneoxides, anionic fluorinated surfactants, like quaternary ammonium salt of perfluoroalkyl sulfonates, non-ionic surfactants like polyhydric alcohol fatty acid esters, higher fatty acid amines, higher fatty acid amides, and ethylene oxide adducts of higher fatty acid esters, amines or amides and the like, polyoxyethylene ether of a fatty alcohol, glycerol fatty acid ester, preferably polyhydric alcohol fatty acid ester and their ethoxylated derivatives, more preferably ethoxylated sorbitan derivatives with higher fatty acids such as those marketed under the trade name of Tweens or Polysorbates, preferably with fatty acids from C14 to C24, in particular ethoxylated sorbitan monooleate marketed as Tween 80. The amount of anti-fogging agent added to the heat-sealable layer is generally from 0.5 to 8%, from 1 to 5%, from 1 to 3%, preferably from 0.5% to 2.5% by weight of the heat-sealable layer.

Alternatively, the anti-fogging agent may be in the form of a coating applied onto the heat-sealable outer layer. Conventional techniques can be used for the application of the anti-fogging agent to the heat-sealable layer, like gravure coating, reverse kiss coating, fountain bar coating, spraying.

The application of the anti-fogging agent may be carried out either by an in-line method involving application during the manufacture of the heat-shrinkable polyester film or by an off-line coating method involving application after the manufacture of the heat-shrinkable polyester film.

Suitable anti-fogging agents for this application are non-ionic surfactants like polyhydric alcohol fatty acid esters, higher fatty acid amines, higher fatty acid amides, polyoxyethylene ethers of higher fatty alcohols, and ethylene oxide adducts of higher fatty acid esters, amines or amides. Among these, polyhydric alcohol fatty acid esters and their polyethoxylated derivatives, polyoxyethylene ethers of higher fatty alcohols and glycerin fatty acid esters are preferred, ethoxylated sorbitan derivatives with higher fatty acids such as those marketed under the trade name of Tweens or Polysorbates, preferably with fatty acids from C14 to C24, are more preferred, in particular ethoxylated sorbitan monooleate marketed as Tween 80 is even more preferred. The amount of the anti-fogging agent coating is not particular limited, but it may be 0.1 to 8 ml/m$^2$, 0.5 to 7 ml/m$^2$, 0.5 to 5 ml/m$^2$.

The multilayer film according to the present invention can be prepared according to known process for the preparation of biaxially oriented films, in particular according to the processes described in the already mentioned WO 2007/093495.

In a preferred practical embodiment, a three-layer film according to the present invention can be manufactured on tenterframe LISIM® line, according to the following methodology and conditions.

The three layers are coextruded through a three-layer feedblock and then distributed through a flat die, typically having a multimanifold system. The melt out of the die is quenched onto a chill roll; electrostatic pinning is used to favour the intimate contact between melt and chill roll. The so formed cast is then biaxially oriented. The stretching is done sequentially, first in machine direction (MD) and then in transverse direction (TD), or simultaneously, preferably simultaneously, at ratios of at least 3:1 in both MD and TD, and at temperature from 90° C. to 106° C., preferably from 95° C. to 100° C. (preheating zones) and from 88° C. to 104° C., preferably from 92° C. to 100° C. (stretching zones). Before oven exit, the film is generally annealed at temperature from 160° C. to 230° C., according to the shrink level required. The bioriented film is finally cooled, edge trimmed and wound into mill logs.

Typically the films of the present invention have no or negligible shrink (lower than 10%) at temperatures below 140° C.

The invention further provides a package comprising a container, a product placed in the container and a lid formed from the coextruded biaxially oriented polyester film of the invention sealed onto the container.

Typically the surface of the container in contact with the product, i.e. the surface involved in the formation of the seal with the lidding film, comprises a polyester resin. For instance the container can be made of a cardboard coated with a polyester or it can be integrally made of a polyester resin. Examples of suitable containers for the package of the invention are CPET, APET or APET/CPET containers. Such container can be either foamed or not-foamed.

The package is produces by techniques well-known to those skilled in the art. Once the food to be packaged has been introduced into the container, the multilayer film according to the present invention is sealed onto the container by means of temperature and/or pressure using conventional techniques and equipment. The film is placed on the container such that the heat-sealable layer is in contact with the surface of the container and the base layer or the optional outer layer is the outermost surface of the film. Sealing is generally carried out by means of a heated frame at temperatures of from 140° C. to 200° C. at a pressure from 2 bar to 10 bar. Sealing times are generally in the order of 0.3-2.0 seconds. The heat generated by the sealing frame, regardless of the short sealing times, promotes the shrinkage of the films in both directions without distortion of the container to give a taut hermetically sealed lid.

The package is particularly suitable for ready prepared foods (ready meals) which are warmed in a microwave or in a conventional oven. The peculiar characteristics of the multilayer film according to the present invention make the packages sealed with it particularly suitable for heat treatment at high temperatures, generally higher than 140° C., in conventional oven. The multilayer film according to the present invention allows to achieve heat resistance together with good hermeticity and clean peelability of the package significantly improved in comparison with the known packages.

The present invention will be now illustrated by some examples without limiting it.

The following multilayer films were prepared (percentage w/w):

TABLE 1

| Film | Heat-sealable layer | | Base layer | | Outer layer | |
|---|---|---|---|---|---|---|
| A* (33 μm) | PETG EAA (4.5 μm) | 85% 15% | CoPolyEst PETG (22.0 μm) | 60% 40% | CoPolyEst MB1 (6.5 μm) | 98% 2% |
| B* (17.5 μm) | PETG EAA (2.0 μm) | 85% 15% | CoPolyEst PETG (13.5 μm) | 60% 40% | CoPolyEst MB1 (2.0 μm) | 98% 2% |
| C* (33 μm) | CoPolyEst EAA (4.5 μm) | 85% 15% | CoPolyEst PETG (22.0 μm) | 60% 40% | CoPolyEst MB1 (6.5 μm) | 98% 2% |
| I (33 μm) | CoPolyEst PETG EAA (4.5 μm) | 25% 60% 15% | CoPolyEst PETG (22.0 μm) | 60% 40% | CoPolyEst MB1 (6.5 μm) | 98% 2% |
| II (22.5 μm) | CoPolyEst PETG EAA (2.6 μm) | 25% 60% 15% | CoPolyEst PETG (17.3 μm) | 60% 40% | CoPolyEst MB1 (2.6 μm) | 98% 2% |
| III (17.5 μm) | CoPolyEst PETG EAA (2.0 μm) | 25% 60% 15% | CoPolyEst (13.5 μm) | 60% 40% | CoPolyEst MB1 (2.0 μm) | 98% 2% |
| IV (33 μm) | CoPolyEst PETG EAA (4.5 μm) | 45% 40% 15% | CoPolyEst PETG (22.0 μm) | 60% 40% | CoPolyEst MB1 (6.5 μm) | 98% 2% |
| V (22.5 μm) | CoPolyEst PETG EAA (2.6 μm) | 45% 40% 15% | CoPolyEst PETG (17.3 μm) | 60% 40% | CoPolyEst MB1 (2.6 μm) | 98% 2% |
| VI (33 μm) | CoPolyEst PETG EAA (2.5 μm) | 25% 60% 15% | CoPolyEst2 PETG (24 μm) | 60% 40% | CoPolyEst2 MB1 (6.5 μm) | 98% 2% |
| VII (33 μm) | CoPolyEst PETG EAA (4.5 μm) | 65% 20% 15% | CoPolyEst PETG (22.0 μm) | 60% 40% | CoPolyEst MB1 (6.5 μm) | 98% 2% |
| VIII (22.5 μm) | CoPolyEst PETG EAA (2.6 μm) | 65% 20% 15% | CoPolyEst PETG (17.3 μm) | 60% 40% | CoPolyEst MB1 (2.6 μm) | 98% 2% |

PETG (first amorphous polyester) Polyethylene Terephthalate/Glycol Eastman EASTAR PETG 6763, Density 1.27 g/cm3, Glass Transition 81° C. Melt Flow Rate 200° C./05.00 kg, 2.8 g/10 min Viscosity Solution 0.75 mPA·sec CoPolyEst (further polyester) Copolyester Eastman Chemical EASTAPAK COPOLYESTER 9921 Density 1.4000 g/cm3 Melting point 255.0° C.

EAA (thermoplastic resin) Ethylene/Acrylic Acid Copolymer PRIMACOR 3440 Dow Co-monomer content Acrylic Acid 9.7%, Density 0.938 g/cm3, Melt Flow Rate 190° C./02.16 kg 10 g/10 min, Vicar softening point 76° C. CoPolyEst 2 Polyethylene Terephthalate/Glycol Indorama RAMAPET N180 Bulk Density 0.817 g/cm3, Density 1.4 g/cm3, Viscosity Solution 0.80 mPA·sec MB1 Masterbatch AntiBlock and Slip in Polyethylene Terephthalate/Glycol Amorphous Silica and Ester Wax SUKANO G dc S503 Sukano; Additives $SiO_2$ 6%, Additives Wax 10% Apparent density 1.2 g/cm3, Bulk (Apparent) Density 0.8 g/cm3 Moisture Content 0.5% Vicat softening point 82° C.

The performance at cooking in conventional oven for the ready meals packages sealed with the comparative films (A-C and VII-VIII) and with the films according to the present invention (I-VI) was evaluated as follows.

Each package was prepared by filling an ovenable foam tray with food surrogate up to 0.7 mm from the edge and sealing with the multilayer film to be tested:
sealing temperature: 200° C.
sealing time: 0.5 seconds
vacuum/gas: 0.450/0.570 bar The trays were put closed in the conventional oven pre-heated at the test temperatures (180° C. or 200° C.) and kept inside the oven for 20 minutes after the temperature of the oven reached again the test value.

The trays were taken out of the oven and the following parameters were evaluated: by visual check:
hermeticity (leaker rate<0.5% very good; 0.5-1.5% good; 1.5-3% acceptable; >3% not acceptable)

tray appearance (deformation<0.5% very good; 0.5-1.5% good; 1.5-3% acceptable; >3% not acceptable)

top lid appearance: very good (the lid appeared as it was originally), good (only a minor difference was present), acceptable (minor curling but peel tab graspable), not acceptable (brittle peel tab or not visible, burns, etc.)

peelability after 1-2 minutes after removal from the oven: very good (easy and clean peel), good (easy and clean peel but some strength required), acceptable (easy and clean peel but minor fringes or tear), not acceptable (presence of tearing, delamination or fringes), n.d. not detectable (package open)

In addition free shrinks values at 140° C. and 160° C. were measured according to ASTM D2732 while the haze of each film was evaluated, according to ASTM D1003, to check the optical characteristics.

The results are reported in the following table.

TABLE 2

|  | Shrink % 140° C. | Shrink % 160° C. | Haze % | Hermeticity | Tray appearance | Top lid appearance | Peelability |
|---|---|---|---|---|---|---|---|
| A | 5.5 | 12.0 | 26.0 | Not acceptable | Good | Not acceptable (shrunk) | n.d. |
| B | 6.5 | 12.0 | 12.0 | Not acceptable | Good | Not acceptable (shrunk) | n.d. |
| C | 1.5 | 4.0 | 12.0 | Not acceptable | Acceptable | Acceptable | Not acceptable (welded, does not open) |
| I | 4 | 10.5 | 5.5 | Very good | Good | Good | Acceptable |
| II | 3.5 | 9.0 | 5.0 | Very good | Good | Good | Good |
| III | 2.5 | 7.5 | 5.0 | Good | Acceptable | Good | Good |
| IV | 3.0 | 7.5 | 6.0 | Acceptable | Acceptable | Acceptable | Acceptable |
| V | 4.0 | 10.0 | 4.5 | Acceptable | Acceptable | Acceptable | Acceptable |
| VI | 3 | 9 | 9 | Good | Good | Good | Very good |
| VII | 3.5 | 8.5 | 8.5 | Good | Acceptable | Acceptable | Not acceptable |
| VIII | 3.0 | 8.0 | 6.0 | Good | Acceptable | Acceptable | Not acceptable |

The multilayer films according to the present invention (I-VI) show resistance at high temperatures, good hermeticity, clean peelability and improved optics in comparison with the known films. Films VII and VIII do not show a satisfactory peelability.

The invention claimed is:

1. A coextruded, biaxially oriented multilayer film comprising
a base layer comprising a polyester having an intrinsic viscosity measured according to ASTM method D4603-03 greater than 0.75 dl/g and a heat-sealable layer directly adhered to said base layer, said heat-sealable layer comprising
from about 25% to 70% by weight of an amorphous polyester having a melting temperature not higher than the melting temperature of the polyester of the base layer, wherein said amorphous polyester is derived from an aliphatic diol and a cycloaliphatic diol with one or more dicarboxylic acids,
from 10% to 20% by weight of a thermoplastic resin, wherein the thermoplastic resin comprises at least one member selected from the group consisting of polyamide, polystyrene, ionomer resin, ethylene/unsaturated carboxylic acid copolymer, ethylene/unsaturated ester copolymer, ethylene/propylene copolymer, and ethylene/cyclic olefin copolymer; and
from 20% to 60% by weight of a further polyester, which is different from the first amorphous polyester, wherein the further polyester resin comprises at least one further polyester resin selected from those derived from one or more aliphatic diols and an aromatic dicarboylic acid and it is characterized by a melting point higher than 240° C.
the multilayer film having a free shrink of less than 10% at temperature below 140° C. measured according to ASTM D2732.

2. A film according to claim 1 wherein the amorphous polyester in the heat-sealable layer is derived from an aliphatic diol and a cycloaliphatic diol with an aromatic dicarboxylic acid.

3. A film according to claim 2 wherein the amorphous polyester is a co-polyester of terephthalic acid with an aliphatic diol and a cycloaliphatic diol.

4. A film according to claim 1 wherein the amorphous polyester resin in the heat-sealable layer is the same polyester resin used in the base layer.

5. A film according to claim 1 wherein the further polyester resin is derived from one or more aliphatic diols.

6. A film according to claim 5 wherein the further polyester resin is polyethylene terephthalate.

7. A film according to claim 1 wherein the thermoplastic resin is selected among polyamides, polystyrenes, ionomers, ethylene/unsaturated carboxylic acid copolymers, ethylene/unsaturated esters copolymers, and ethylene/propylene copolymers and ethylene/cyclic olefin copolymers.

8. A film according to claim 7 wherein the thermoplastic resin is an ethylene/(meth)acrylic acid copolymer.

9. A film according to claim 1 wherein in the heat-sealable layer of the multilayer film the amount of the first amorphous polyester is from 40 to 60% by weight, the amount of the further polyester is from 25 to 50% by weight and the amount of thermoplastic resin is about 15% by weight, with respect to the total weight of the heat-sealable layer.

10. A film according to claim 1 wherein the heat-sealable layer of the multilayer film further comprises an anti-fog agent.

11. A film according to claim 1 wherein the heat-sealable layer of the multilayer film is coated with an anti-fog agent.

12. A film according to claim 10 wherein said anti-fog agent is a non-ionic surfactant.

13. A film according to claim 1 comprising an outer layer on the opposite side of the base layer to the heat-sealable layer.

14. A package comprising a container, a food product, and a lid formed of a coextruded, biaxially oriented, heat-sealable film according to claim 1 sealed onto said container.

15. The package according to claim 14 for use in conventional oven at temperatures higher than 140° C.

16. The film according to claim 3 wherein the amorphous polyester is a co-polyester of terephthalic acid with ethylene glycol and 1,4-dicyclohexanedimethanol.

17. The film according to claim 5 wherein the further polyester resin comprises a polyester derived from ethylene glycol, cyclohexandimethanol, and terephthalic acid.

18. The film according to claim 7 wherein the thermoplastic resin comprises at least one member selected from the group consisting of styrene-butadiene block copolymer, ethylene/(meth)acrylic acid copolymer, ethylene/vinyl acetate copolymer, and ethylene/norbornene copolymer.

19. The film according to claim 12 wherein said anti-fog agent is a non-ionic surfactant comprising at least one member selected from the group consisting of polyhydric alcohol fatty acid ester, ethoxylated derivative of polyhydric alcohol fatty acid ester, and ethoxylated sorbitan ester with higher fatty acids.

* * * * *